US011505148B2

(12) United States Patent
Carrillo Fernandez et al.

(10) Patent No.: US 11,505,148 B2
(45) Date of Patent: Nov. 22, 2022

(54) VEHICLE REINFORCEMENT ASSEMBLY

(71) Applicants: NISSAN NORTH AMERICA, INC., Franklin, TN (US); NISSAN MOTOR CO., LTD., Yokohama (JP)

(72) Inventors: Omar Fernando Carrillo Fernandez, Toluca (MX); Tomohiro Hida, Kanagawa (JP)

(73) Assignees: NISSAN NORTH AMERICA, INC., Franklin, TN (US); NISSAN MOTOR CO., LTD., Yokohama (JP)

( * ) Notice: Subject to any disclaimer, the term of this patent is extended or adjusted under 35 U.S.C. 154(b) by 571 days.

(21) Appl. No.: 16/586,632

(22) Filed: Sep. 27, 2019

(65) Prior Publication Data
US 2021/0094494 A1    Apr. 1, 2021

(51) Int. Cl.
*B60R 19/48* (2006.01)
*G01S 17/93* (2020.01)
*B60R 19/18* (2006.01)
*G01S 17/931* (2020.01)

(52) U.S. Cl.
CPC .... *B60R 19/483* (2013.01); *B60R 2019/1866* (2013.01); *G01S 17/931* (2020.01)

(58) Field of Classification Search
CPC ......... B60R 19/18; B60R 19/02; B60R 19/04; B60R 19/48; G01S 17/936; G01S 13/93
See application file for complete search history.

(56) References Cited

U.S. PATENT DOCUMENTS

| | | | | |
|---|---|---|---|---|
| 6,755,452 B2* | 6/2004 | Cate | ........................ | B60R 19/22 293/133 |
| 6,997,490 B2* | 2/2006 | Evans | ..................... | B60R 19/18 293/145 |
| 8,368,523 B2* | 2/2013 | Takahashi | ........... | B60R 21/0136 180/274 |
| 10,532,718 B2* | 1/2020 | Hammer | ................. | B60R 21/34 |
| 2002/0149214 A1* | 10/2002 | Evans | ..................... | B60R 19/18 293/133 |
| 2003/0034658 A1 | 2/2003 | Cate et al. | | |
| 2007/0145755 A1 | 6/2007 | Shioya et al. | | |
| 2010/0066106 A1 | 3/2010 | Nojima et al. | | |
| 2013/0168982 A1 | 7/2013 | Ashiya et al. | | |

* cited by examiner

*Primary Examiner* — Tan Q Nguyen
(74) *Attorney, Agent, or Firm* — Global IP Counselors, LLP

(57) ABSTRACT

A vehicle reinforcement assembly includes a detector and a reinforcement member. The detector is configured to be housed in an interior compartment of a vehicle. The reinforcement member is configured to be housed in the interior compartment at a location adjacent to the detector. The reinforcement member has a vehicle forward facing end that extends closer to a vehicle front end than the detector extends to the vehicle front end.

19 Claims, 8 Drawing Sheets

VEHICLE REINFORCEMENT ASSEMBLY

BACKGROUND

Field of the Invention

The present invention generally relates to vehicle reinforcement assembly. More specifically, the present invention relates to vehicle reinforcement assembly disposed adjacent to a detector of the vehicle.

Background Information

Vehicles can be equipped with detector units for various control systems of the vehicle. In particular, vehicles can be equipped with detector units such as radar that receive and transmit signals for use in automotive vehicle control systems such as Adaptive Cruise Control (ACC alternatively known as Autonomous Cruise Control), Collision Avoidance Systems (CAS), Intelligent Parking Assist Systems (IPAS), lane monitoring systems, and other autonomous vehicle-maneuvering features. Detector units can be costly and expensive to repair or replace. Detector units can be housed or disposed at a front end of the vehicle behind the vehicle's grille.

SUMMARY

In view of the state of the known technology, one aspect of the present disclosure is to provide a vehicle reinforcement assembly comprising a detector and a reinforcement member. The detector is configured to be housed in an interior compartment of a vehicle. The reinforcement member is configured to be housed in the interior compartment at a location adjacent to the detector. The reinforcement member has a vehicle forward facing end that extends closer to a vehicle front end than the detector extends to the vehicle front end.

In view of the state of the known technology, another aspect of the present disclosure is to provide a vehicle comprises a vehicle grille, a bumper, a detector and a first reinforcement member. The vehicle grille has an interior side and an exterior side. The bumper is disposed on the interior side of the vehicle grille. The detector is disposed on the interior side of the vehicle grille and spaced from the vehicle grille. The first reinforcement member is supported at a location adjacent to the bumper and adjacent to the detector. The first reinforcement member has a vehicle forward facing end that extends closer to the vehicle grille than the detector extends to the vehicle grille.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
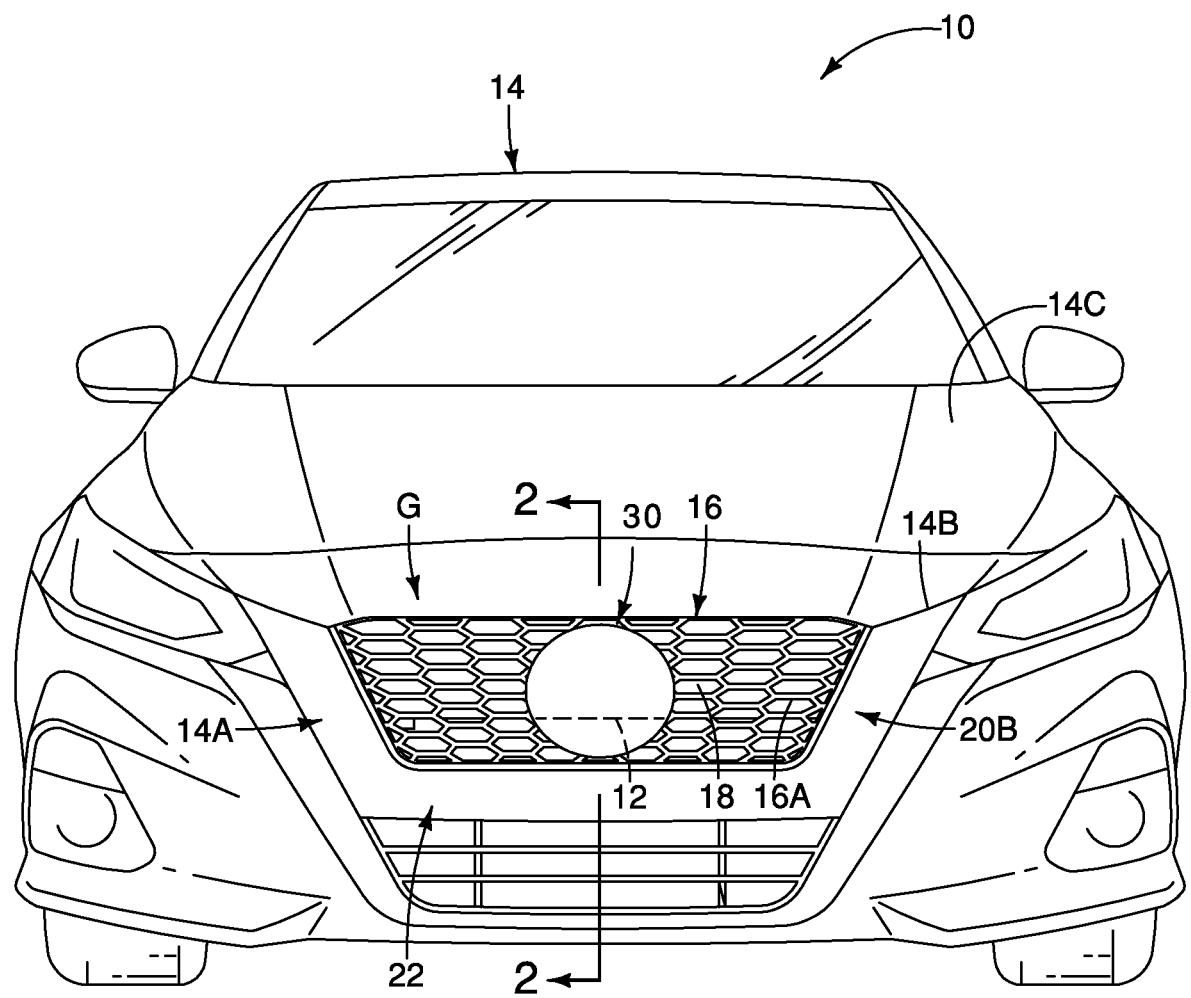
FIG. 1 is an elevational view of a front end of a vehicle equipped with a grille assembly and a reinforcement assembly disposed behind the grille assembly.
Figure 2:
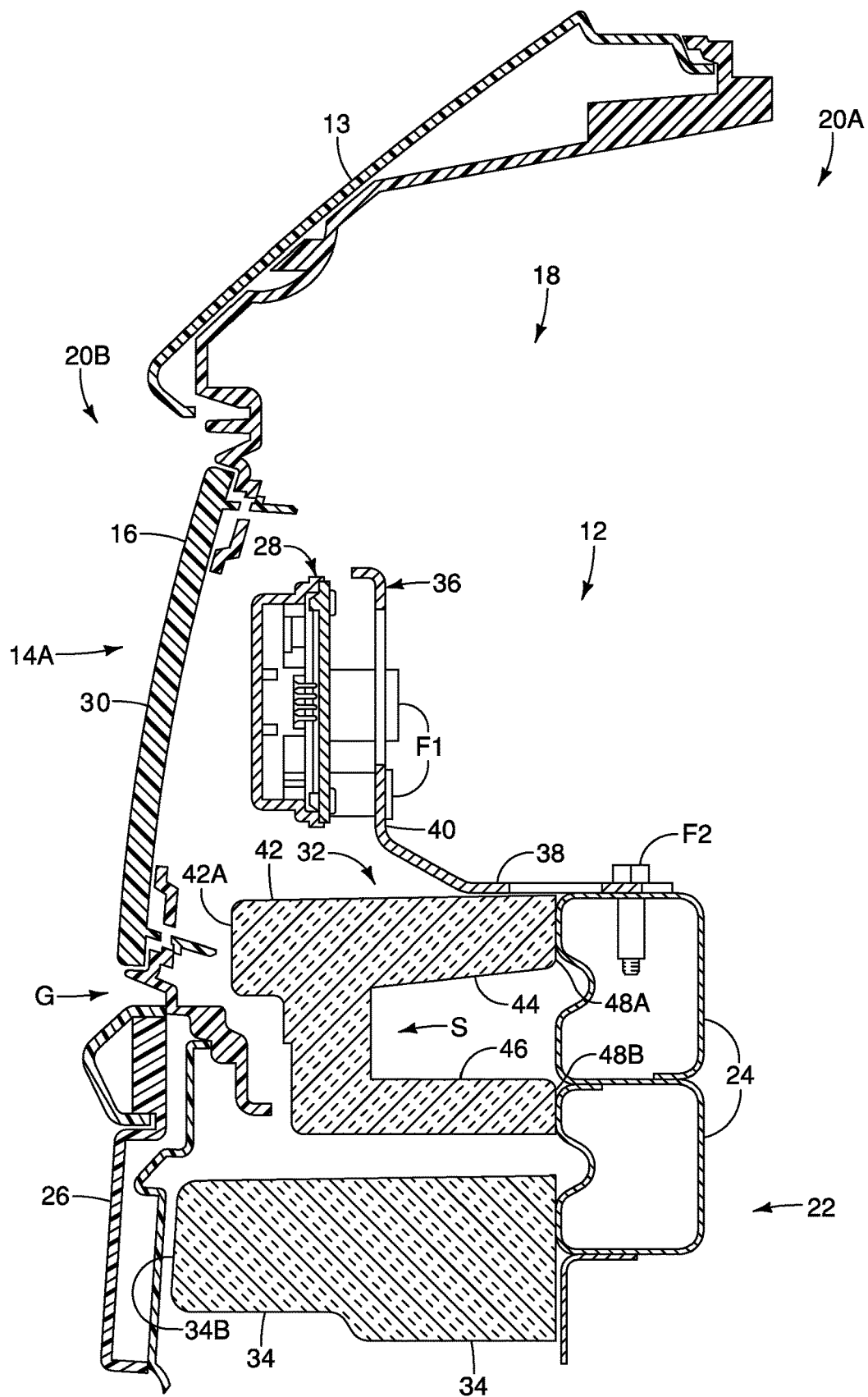
FIG. 2 is a cross-sectional view of the vehicle taken along lines 2-2 of FIG. 1 to show the reinforcement assembly prior to contact with an external object.

Referring now to FIG. 1, a vehicle 10 having a vehicle reinforcement assembly 12 is shown in accordance with an illustrated embodiment. The vehicle 10 includes a vehicle body 14 having a fascia 13 that includes a vehicle front end 14A. The fascia 13 is preferably made of rigid materials(s), such as resilient plastic. The fascia 13 helps define the front end 14A appearance of the vehicle 10. As best seen in FIGS. 1 and 2, the fascia 13 is supported against a vehicle grille 16 that covers an opening 14B of the vehicle body 14 at a location underneath a vehicle hood 14C. The opening 14B leads to an interior compartment 18 housing the vehicle's 10 radiator (not shown) and engine (not shown). As seen in FIG. 1, the grille 16 includes a plurality of openings 16A to allow airflow under the hood 14C in order to cool the engine and radiator. The vehicle grille 16 has an interior side 20A and an exterior side 20B. In the illustrated embodiment, the interior side 20A refers to an area adjacent to the vehicle grille 16 in the vehicle rearward direction, and the exterior side 20B refers to an area adjacent to the vehicle grille 16 in the vehicle forward direction.

Figure 3:
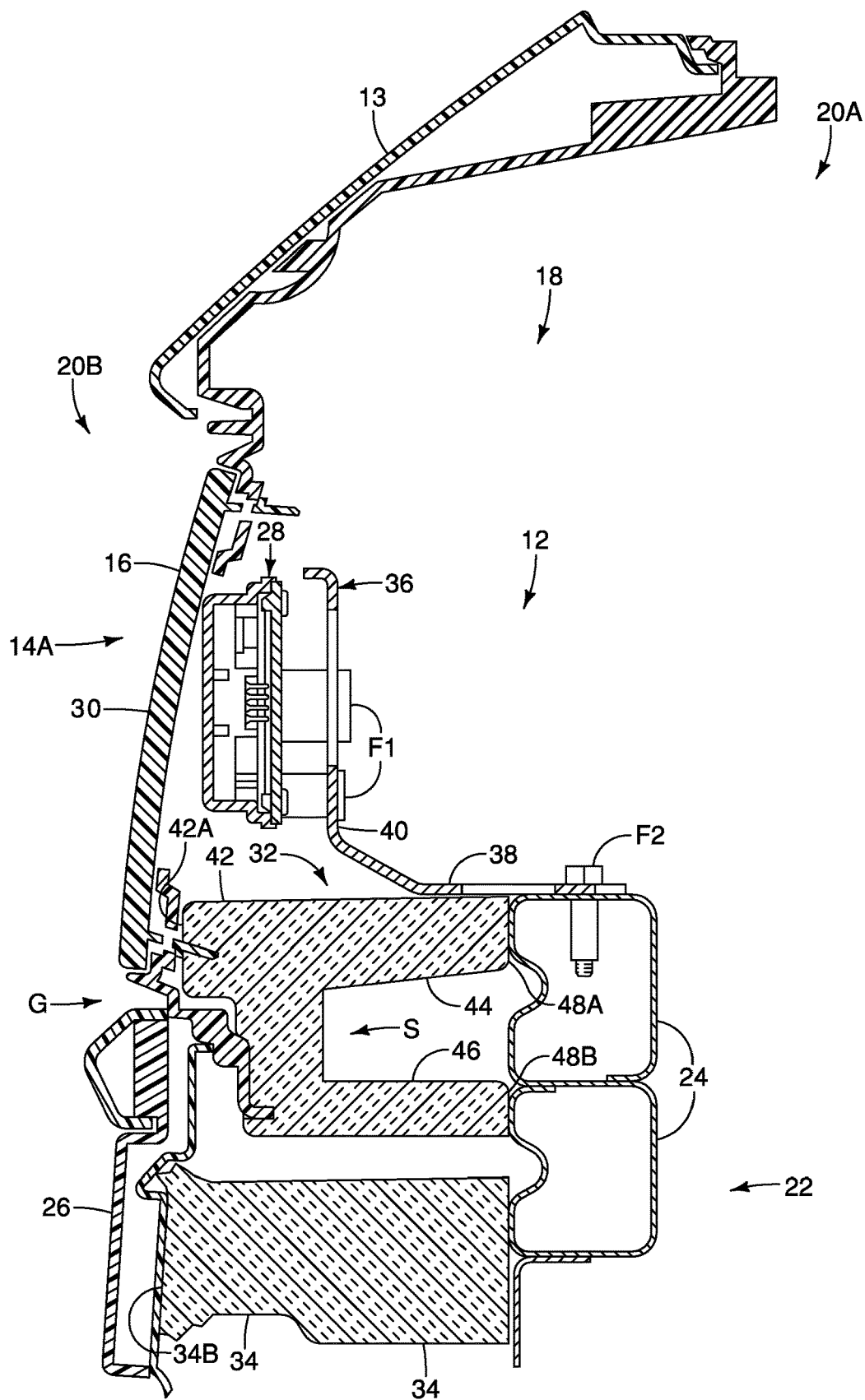
FIG. 3 is a cross-sectional view similar to FIG. 2 showing the grille assembly after a low-speed impact with an external object.

As seen in FIGS. 2 and 3, the vehicle 10 further includes a bumper assembly 22 having a bumper 24 located on the interior side 20A of the grille 16 and a bumper molding 26 located on the exterior side 20B of the grille 16. The vehicle 10 further comprises a detector 28 disposed on the interior side 20A of the grille 16 that is disposed within the interior compartment 18. The vehicle 10 further includes a grille badge 30 that is supported on the exterior side 20B of the grille 16. The grille badge 30 is disposed forward of the detector 28 and is preferably made and configured to protect the detector 28. The grille badge 30 is preferably formed as a radar-transparent jewel-like badge having a multi-dimensional A-surface through which the emitted and/or received radar signals are readily transmitted without significant attenuation. In the illustrated embodiment, the fascia 13, the grille 16 and the grille badge 30 are considered grille components of the vehicle 10 that are part of a vehicle grille assembly G.

Referring to FIGS. 2 to 7, the vehicle 10 further includes a first reinforcement member 32 and a second reinforcement member 34 that are disposed on the interior side 20A of the vehicle grille 16. The first and second reinforcement members 32 and 34 are housed in the interior compartment 18. The reinforcement assembly 12 includes the first reinforcement member 32. As will be further discussed below, the first reinforcement member 32 further serves to reinforce the vehicle's 10 components, such as the detector 28. In the illustrated embodiment, the vehicle reinforcement assembly 12 comprises the detector 28 and the first reinforcement member 32, as will be further discussed below. Preferably, the first and second reinforcement members 32 and 34 are both components of the reinforcement assembly 12 that are energy absorbing and energy transferring members for the vehicle 10. Therefore, the vehicle reinforcement assembly 12 further includes the second reinforcement member 34.

The bumper 24 is disposed on the interior side 20A of the vehicle grille 16. The bumper 24 is fixed to a vehicle forward area to absorb energy from the vehicle's 10 contact with an external object. Therefore, the bumper 24 is a front bumper 24. The bumper 24 is made and configured to protect the vehicle's 10 components (such as the engine and the radiator) as well as the passenger compartment by dissipating the kinetic energy received from contacting an external object. The bumper 24 can be a rigid piece of metal such as stamped steel that is shaped to the vehicle's 10 specifications. Alternatively, the bumper 24 can be made to flexible materials such as high-grade thermoplastic material, polypropylene foam or deformable plastics to absorb energy from the vehicle's 10 contact with an external object(s). The bumper molding 26 is a trim component mounted to the grille 16 below the grille badge 30. The bumper molding 26 is preferably made of plastic or fiberglass and serves as a protective molding for the bumper 24 to maintain the outward appearance of the vehicle 10.

Figure 4:
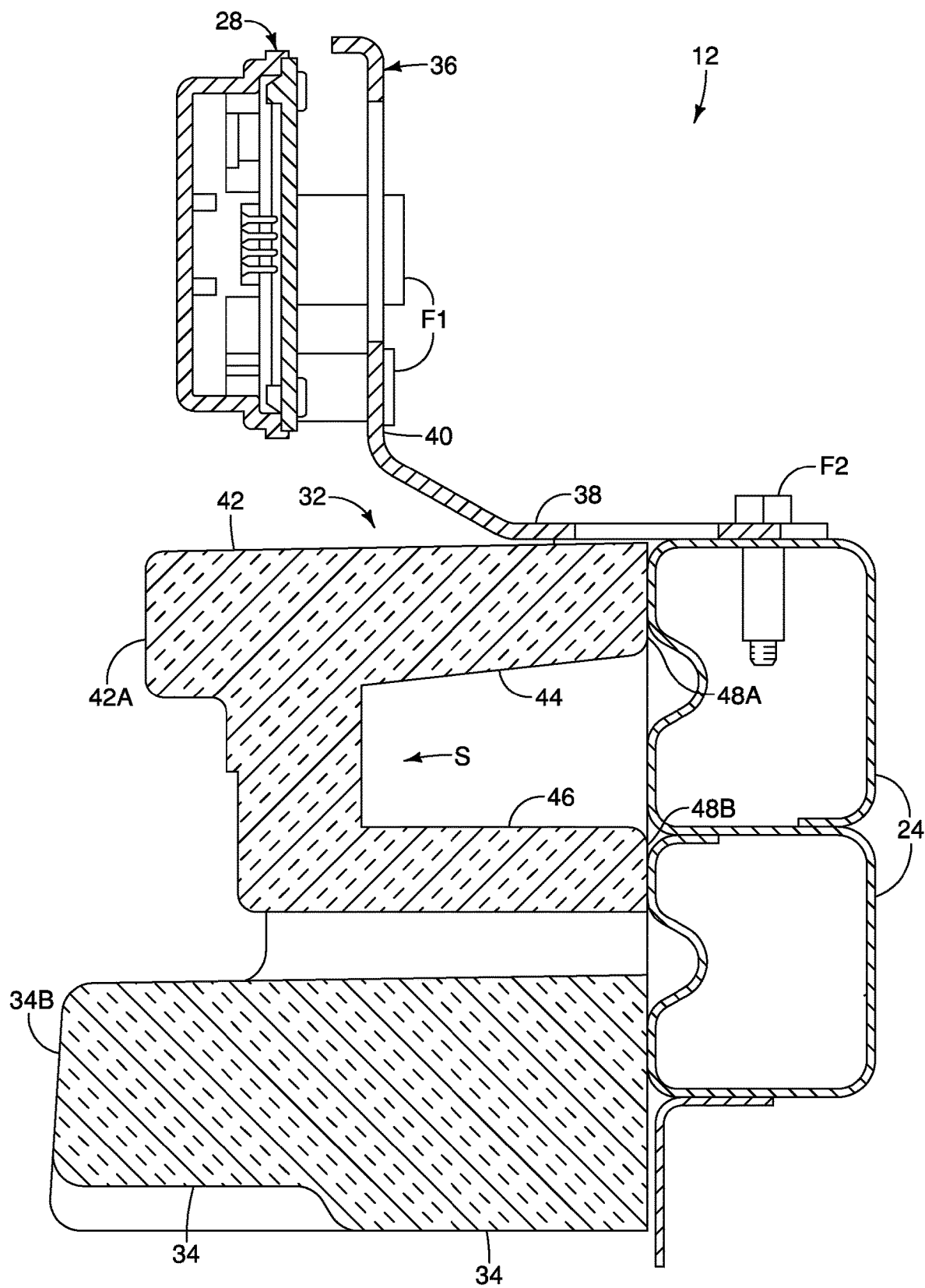
FIG. 4 is an enlarged view of the reinforcement assembly of FIG. 2.

As best seen in FIG. 4, the detector 28 is supported by a detector bracket 36. The detector 28 is mounted to the detector bracket 36 by one or more fasteners F1. As shown, the detector 28 is mounted to the detector bracket 36 by a plurality of through bolts. Therefore, the detector bracket 36 supports the detector 28 to the bumper 24. In particular, the detector bracket 36 is attached to the bumper 24 by one or more fasteners F2 such as bolts, screws, fasteners the like. While the illustrated embodiment illustrates the fixing member as being bolts in FIGS. 4 to 6, it will be apparent to those skilled in the vehicle field from this disclosure that the detector bracket 36 can be fixed to the bumper 24 by any fastening means as appropriate.

The detector bracket 36 includes an attachment part 38 and a projecting part 40 that extends cantilevered with respect to the attachment part 38. The detector bracket 36 is a rigid member that is fixed to the bumper 24 at the attachment part 38. The detector bracket 36 can be made of metal such as stamped steel or from plastic. The detector bracket 36 can include breaks or openings so that the detector bracket 36 is lightweight. The attachment part 38 is fixed to the bumper 24 by the fasteners F2. The detector 28 is mounted to the detector bracket 36 at the projecting part 40. In the illustrated embodiment, the detector bracket 36 is a one-piece rigid member made of metal. In other words, the attachment part 38 and the projecting part 40 together form a one-piece integral member. It will be apparent to those skilled in the vehicle field from this disclosure that the detector bracket 36 can include additional reinforcement pieces, such as a truss extending between the projecting part 40 and the attachment part 38 to provide further structural support for the detector 28.

As seen in FIG. 2, the detector 28 is housed in the interior compartment 18 behind the grille 16 and preferably behind the grille badge 30. In other words, the detector 28 is disposed on the interior side 20A of the vehicle grille 16. The detector 28 is supported to the bumper 24 such that the detector 28 is spaced from the vehicle grille 16. The detector 28 is supported to the bumper 24 by the detector bracket 36 above the first reinforcement member 32. Therefore, the detector 28 is fixed adjacent to the first reinforcement member 32.

The detector 28 of the illustrated embodiment is made and configured for use in one or more vehicle control systems. For example, the detector 28 can be a radar sensor that is part of a sensor system for use in automated vehicle control of the vehicle 10. The detector 28 can be one or more of an on-board laser, infrared or video sensor(s). That is, the detector 28 can be part of a single on-board sensor or part of a multi-sensor radar array that operates in conjunction with a computer-automated vehicle control system. The detector 28 can detect electromagnetic radio waves for use in automotive vehicle control systems such as Adaptive Cruise Control (ACC alternatively known as Autonomous Cruise Control), Collision Avoidance Systems (CAS), Intelligent Parking Assist Systems (IPAS), lane monitoring systems, and other autonomous vehicle-maneuvering features. In particular, ACC and CAS typically utilize front-mounted radar sensors for determining a distance forward of the vehicle 10, as well as its relative speed, and/or a directional angle of the vehicle 10.

In the illustrated embodiment, the first reinforcement member 32 is assembled and configured to reinforce the detector 28 upon the vehicle 10 experiencing contact with an external object. In particular, in the occasion that the vehicle 10 experiences contact with an external object that is forward of the vehicle 10, the grille assembly G and/or the bumper molding 26 can move toward the interior compartment 18. In other words, the contact with an external object can cause the grille 16 to experience rearward displacement (e.g., stroke) toward the interior compartment 18. Under enough force, the second reinforcement member 34 can deform in order to dissipate the energy of the contact. In the illustrated embodiment, the first reinforcement member 32 has a density that is greater than a density of the second reinforcement member 34 to be more robust in order to prevent damage to the detector 28. That is, the first reinforcement member 32 is configured to contact the grille 16 and/or the components of the grille assembly G during rearward displacement of the grille 16. By doing so, the first reinforcement member 32 prevents the grille assembly G from coming into contact with the detector 28, or decreases the force of impact created from the grille assembly G contacting the detector 28, as seen in FIG. 3. In other words, the first reinforcement member 32 decreases the rearward stroke of the grille assembly G to decrease rearward displacement of the grille assembly G. By reducing the rearward displacement of the grille assembly G, the first reinforcement member 32 reduces or prevents possible damage and/or dislocation of the detector 28. The first reinforcement member 32 also serves as a robustness enhancer for the detector 28 by supporting the detector 28 within the interior compartment 18, as will be further described below.

As best seen in FIGS. 2 to 5, the first reinforcement member 32 is disposed forward of the detector 28. That is, the first reinforcement member 32 is disposed closer to the grille 16 than the detector 28 is disposed to the grille 16. Therefore, in the event of rearward displacement of the grille 16, the grille 16 contacts the first reinforcement member 32 prior to contacting the detector 28, as seen in FIG. 3. As the first reinforcement has a high density, the first reinforcement member 32 is robust enough to receive the force of contacting the grille 16 without deforming when the vehicle 10 experiences a low speed contact with an external object. Preferably, the first reinforcement member 32 has a density such that the first reinforcement does not deform when the vehicle 10 experiences contact with an external object at about 1 to 3 miles per hour. For example, if the external object is traveling at about 2.5 miles per hour when contacting the vehicle 10 and causes rearward displacement of the grille 16, the first reinforcement member 32 should contact the grille 16 and does not deform in order to stop or minimize the rearward displacement. In this way, as seen in FIG. 3, the first reinforcement member's 32 contact with the grille 16 can mitigate the impact that the detector 28 receives from the grille 16.

Figure 5:
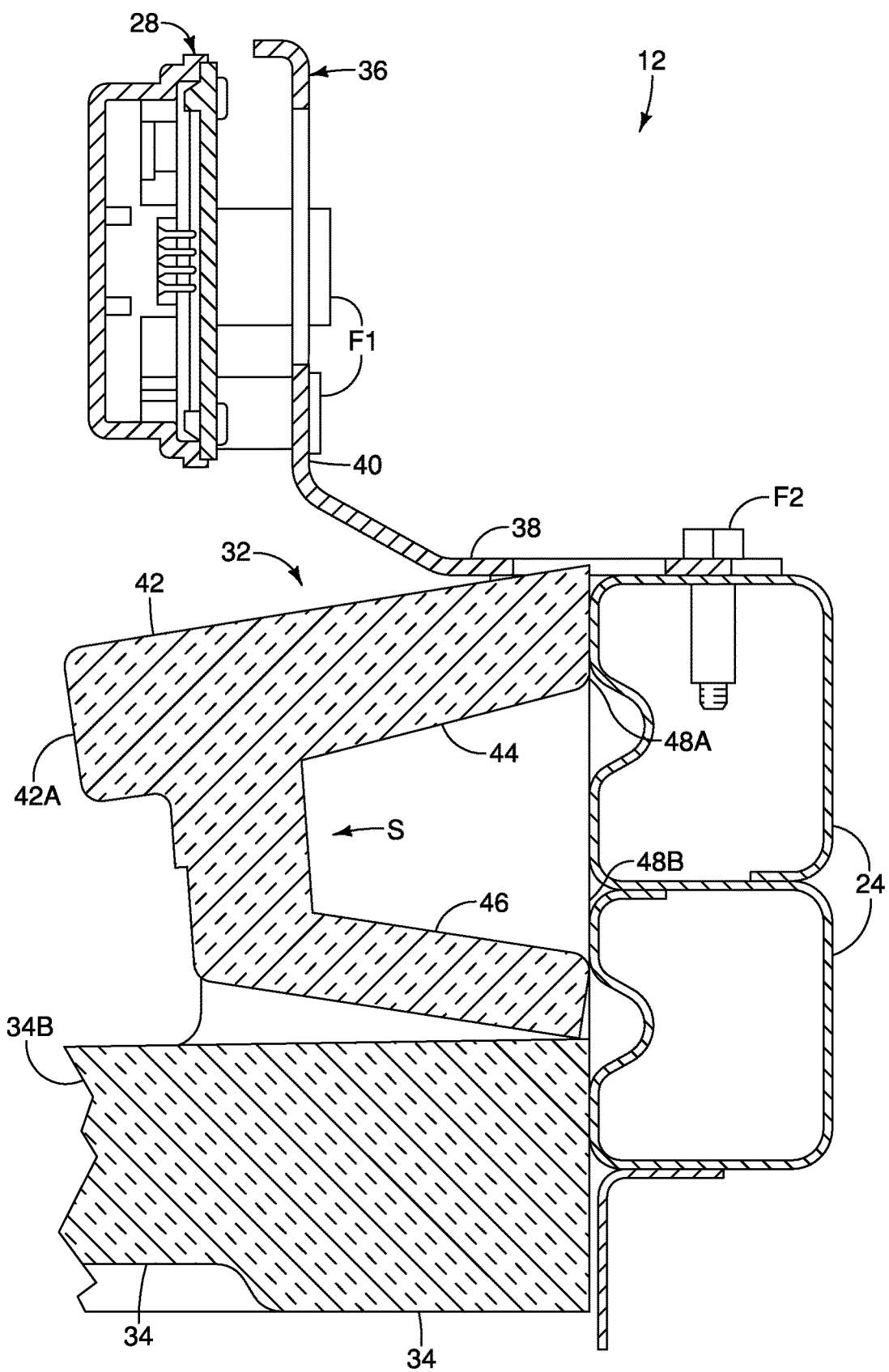
FIG. 5 is an enlarged view of the reinforcement assembly similar to FIG. 3 but with the reinforcement assembly deformed after a high-speed impact with an external object.

Additionally, in the event that the vehicle 10 experiences contact with an external object at a higher speed, the first reinforcement member 32 is made and configured to deform to dissipate the energy of the impact, as seen in FIG. 5. By being deformable under a predetermined force from a high-speed contact, the first reinforcement member 32 deforms and allows the second reinforcement member 34 to deform and dissipate kinetic energy as necessary. As shown, the first reinforcement member 32 has a shape that enables the first reinforcement member 32 to deform under a predetermined force. By having a higher density than the second reinforcement member 34, the first reinforcement member 32 prevents and/or minimizes potential damage to the detector 28 at low-speed contact(s) with external object(s). The deformation of the first reinforcement member 32 will be further discussed below.

In the illustrated embodiment, the first reinforcement member 32 preferably has a density ranging from 100 to 200 grams per liter. More preferably, the first reinforcement member 32 has a density ranging from 120 to 180 grams per liter. More preferably, the first reinforcement member 32 has a density of at least 120 grams per liter to decrease the rearward displacement of the grille 16. In the illustrated embodiment, the density of the first reinforcement member 32 is 3 to 7 times greater than the density of the second reinforcement member 34. More preferably, in the illustrated embodiment, the first reinforcement member 32 preferably has a density that is approximately five times greater than that of the density of the second reinforcement member 34.

In the illustrated embodiment, the second reinforcement member 34 can have a density of approximately 20 to 40 grams per liter to enable the second reinforcement member 34 to deform upon the vehicle 10 experiencing a forward contact with an external object. Therefore, the first reinforcement member 32 preferably has a density ranging from 100 to 200 grams per liter in view of the density of the second reinforcement member 34. More preferably, in the illustrated embodiment, the second reinforcement member 34 has a density of approximately 30 grams per liter. Therefore, in the illustrated embodiment, the first reinforcement member 32 more preferably has a density of approximately 120 grams per liter. It will be apparent to those skilled in the vehicle field from this disclosure that the densities of the first and second reinforcement members 32 and 34 can vary to accommodate different vehicle components and/or depending on the vehicle's make.

In the illustrated embodiment, the first and second reinforcement members 32 and 34 are preferably made of material(s) designed for energy absorption, cushioning and multiple impact resistance. The first and second reinforcement members 32 and 34 are also preferably made of material(s) that are buoyant, water and chemical resistant and possesses a high strength to weight ratio. In the illustrated embodiment, the first and second reinforcement members 32 and 34 are constructed from foam such as expanded polypropylene having versatile closed-cell beads that can be formed to different densities by molding. In particular, the individual beads can be fused into different degrees by steam-chest molding to create foams of different densities that are then injected into respective molds to create the first and second reinforcement members 32 and 34. Therefore, the illustrated embodiment, at least the first reinforcement member 32 is a one-piece injection molded member. It will be apparent to those skilled in the vehicle field from this disclosure that the first and second reinforcement members 32 and 34 can alternatively be made of other suitable foam thermoplastics such as polyethylene, including low density polyethylene and high density polyethylene, polypropylene, and co-polymers of ethylene or propylene.

Figure 6:
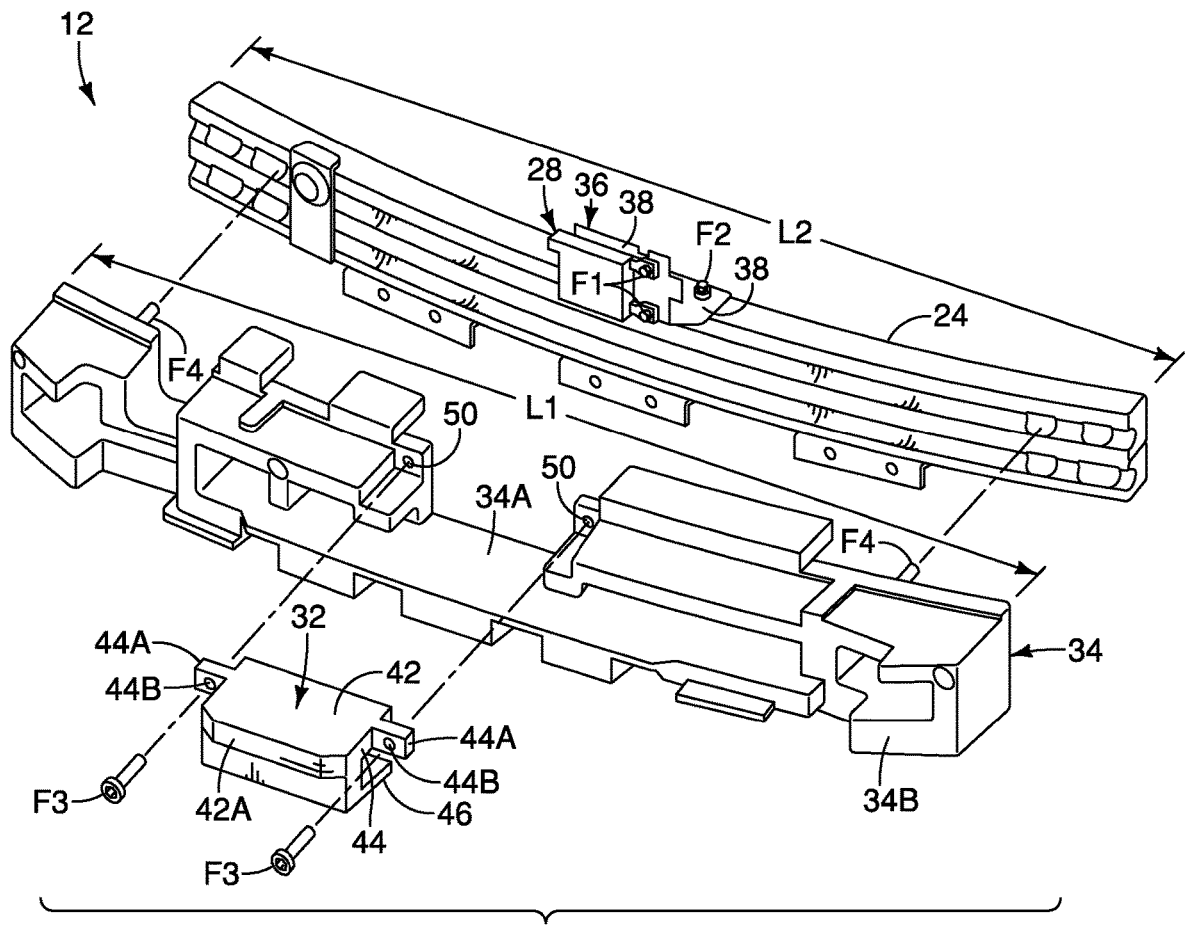
FIG. 6 is an exploded view of the reinforcement assembly.
Figure 7:
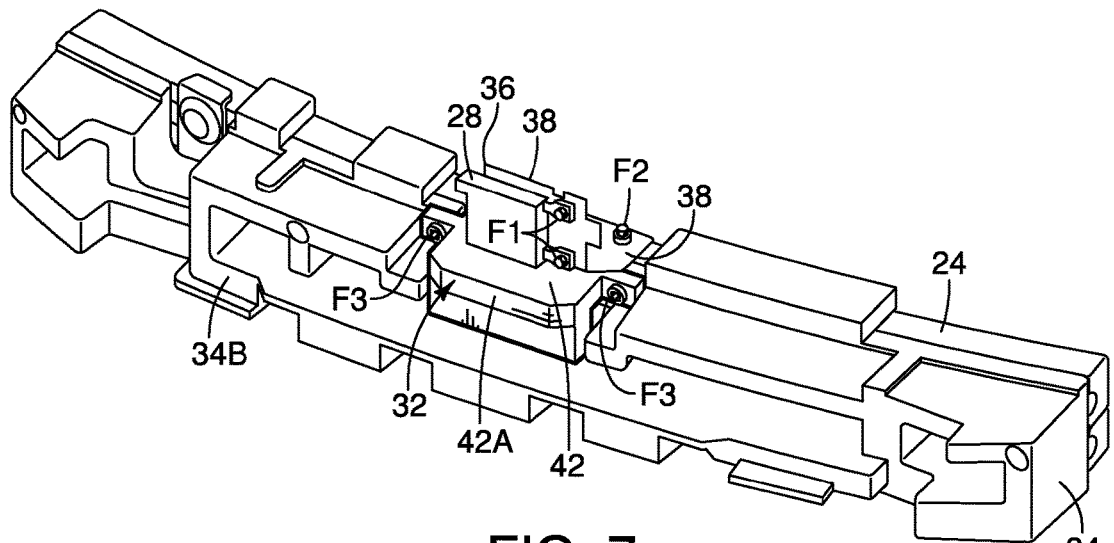
FIG. 7 is a perspective view of the reinforcement assembly installed to the bumper.
Figure 8:
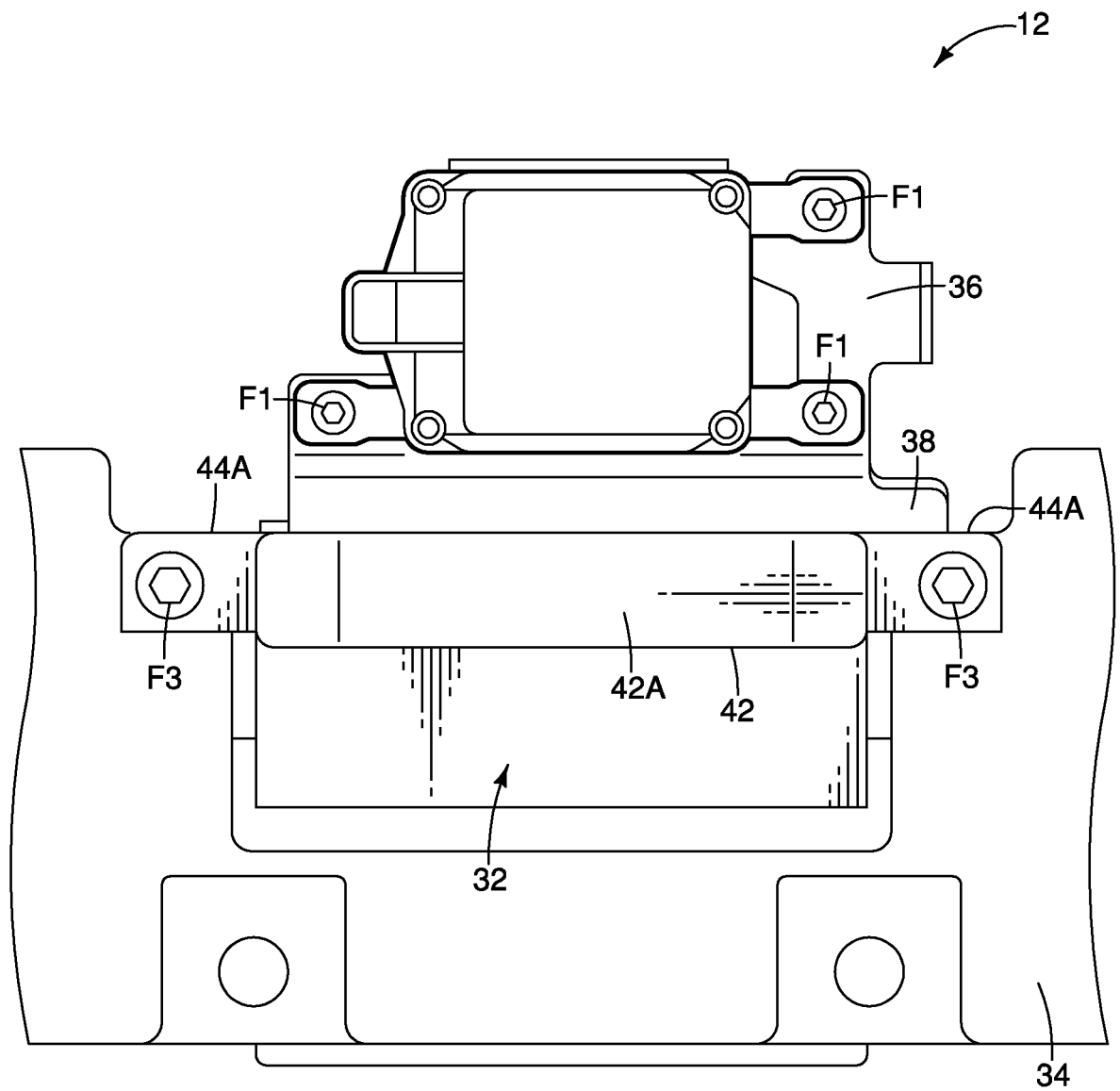
FIG. 8 is an enlarged partial front elevational view of the reinforcement assembly.

Referring to FIGS. 6 to 8, the first reinforcement member 32 is assembled to the second reinforcement member 34. In particular, the first reinforcement member 32 is fixed to the second reinforcement member 34 by one or more fasteners F3, such as screws, bolts, clips, etc. Additionally, it will be apparent to those skilled in the vehicle field from this disclosure that the first reinforcement member 32 can be fitted to the second reinforcement member 34 by other fastening means such as snap-fit or interference fit between the first and second reinforcement members 32 and 34.

As shown, the first reinforcement member 32 is supported to the second reinforcement member 34 at a location adjacent to the bumper 24 and adjacent to the detector 28. In particular, the first reinforcement member 32 is disposed between the second reinforcement member 34 and the detector 28. The first reinforcement member 32 is disposed below the detector 28. In other words, the first reinforcement member 32 extends between the second reinforcement member 34 and the detector 28. The detector 28 is closer to the first reinforcement member 32 than the detector 28 is to the second reinforcement member 34. The first reinforcement member 32 reinforces the detector 28 and the detector bracket 36 and at least partially supports the detector 28 and the detector bracket 36 within the interior compartment 18. As best seen in FIGS. 6 and 7, the first reinforcement member 32 is preferably fixed to a central region 34A of the second reinforcement member 34. In the illustrated embodiment, the central region 34A refers to a region that includes a midpoint of the second reinforcement member 34 extending in a vehicle widthwise direction when the second reinforcement member 34 is installed in interior compartment 18.

Figure 9:
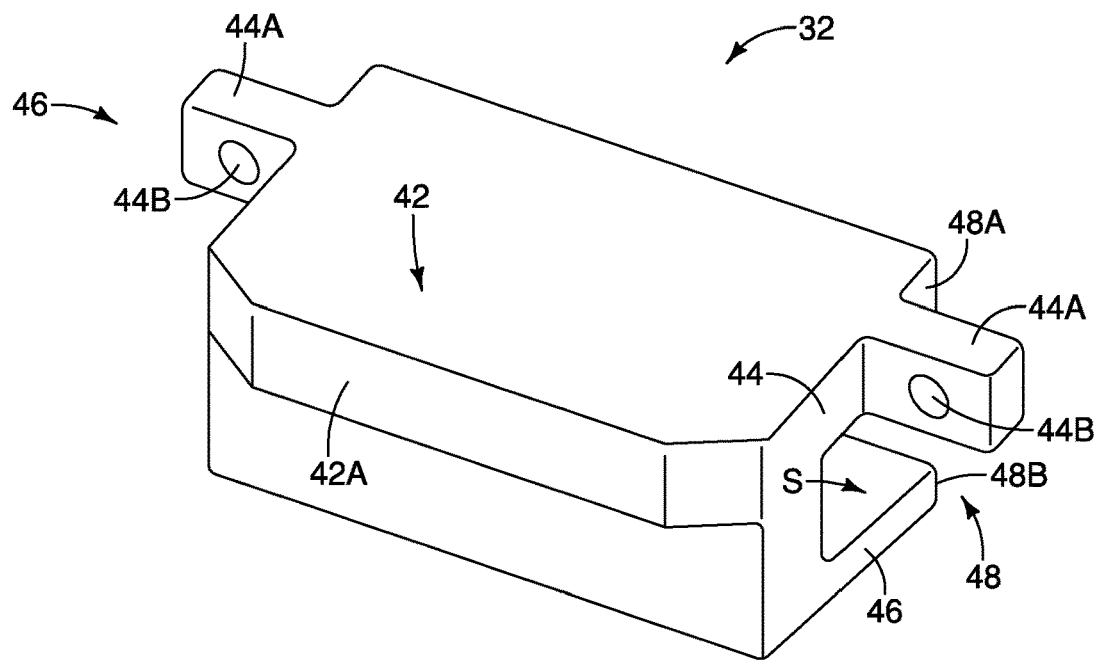
FIG. 9 is a perspective view of a front end of a first reinforcement member of the reinforcement assembly.
Figure 10:
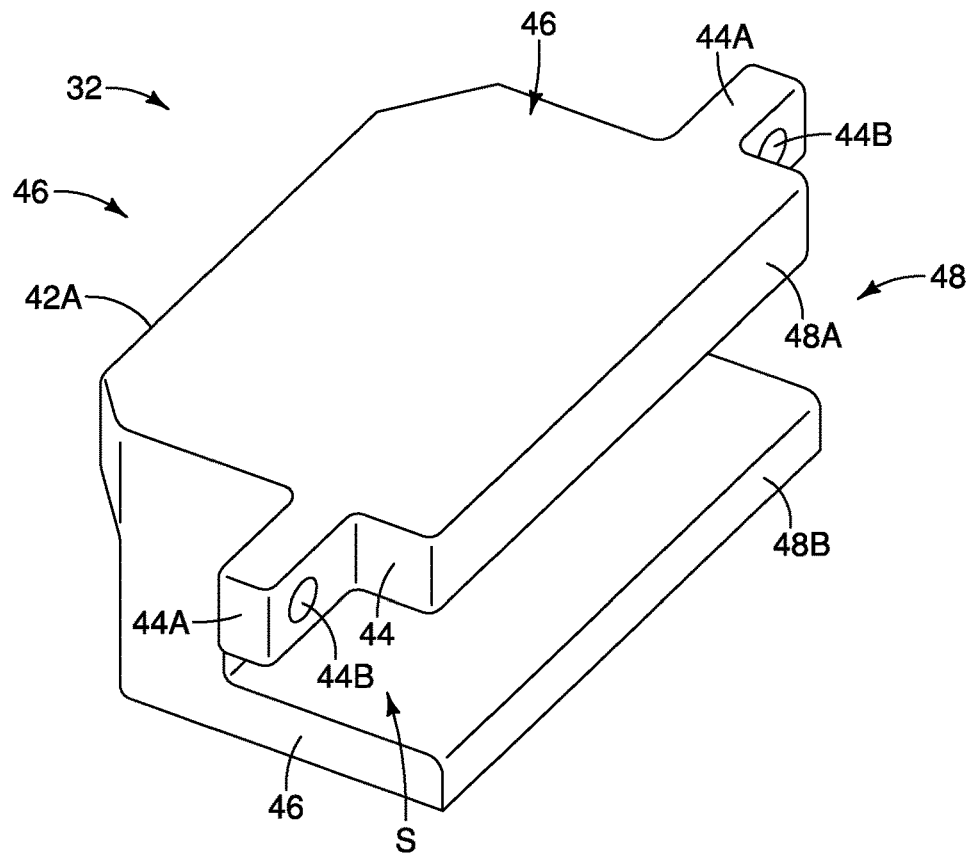
FIG. 10 is a perspective view of a rear end of the first reinforcement member of FIG. 10.

As best seen in FIGS. 6, 9 and 10, the reinforcement member has a main body 42, a first extension 44 extending from the main body 42 and a second extension 46 extending from the main body 42. Referring to FIGS. 2, 3, 8 and 10, the first reinforcement member 32 has a vehicle forward facing end 42A that faces a vehicle forward direction. In particular, the main body 42 includes the vehicle forward facing end 42A. The vehicle forward facing end 42A extends closer to the vehicle front end 14A than the detector 28 extends towards the vehicle front end 14A. Therefore, the vehicle forward facing end 42A extends closer to the vehicle grille 16 than the detector 28 extends to the vehicle grille 16. In particular, the vehicle forward facing end 42A faces the grille 16 and the grille badge 30. In other words, the vehicle forward facing end 42A faces a grille 16 component of the vehicle. In this way, the first reinforcement member 32 is configured to contact the grille 16 before the detector 28 makes contact with the grille 16 in order to stop or reduce rearward displacement of the grille 16 that could damage the detector 28. Additionally, the first reinforcement member 32 serves as a robustness enhancer for the detector bracket 36. As shown in FIGS. 2 to 5, the first reinforcement member 32 provides additional support for the detector bracket 36. At least a portion of the attachment part 38 of the bracket extends along the first reinforcement member 32 so to be supported by the first reinforcement member 32. In this way, the first reinforcement member 32 helps prevent deformation of the bracket when the vehicle 10 contacts an external object so that the detector 28 does not collapse onto the grille 16.

The first reinforcement member includes a vehicle rear facing end 48 that faces away from the vehicle forward facing end 42A. As best seen in FIGS. 2 to 5, the vehicle rear facing end 48 abuts the bumper 24 when the first reinforcement member 32 is installed inside the interior compartment 18. The first extension 44 includes a first rear facing surface 48A that is part of the rear facing end 48. The second extension 46 includes a second rear facing surface 48B that is part of the rear facing end 48. Therefore, the first and second extensions 44 and 46 include the vehicle rear facing end 48 of the reinforcement member. The first and second rear facing end 48s preferably abut the bumper 24 so that the first reinforcement member 32 dissipates energy away from the bumper 24 upon deformation. The first and second extensions 44 and 46 are spaced from each other. In this way, the first and second rear facing surface 48Bs are spaced from each other by a space S.

As best seen in FIGS. 6, 10 and 11, the first extension 44 includes a pair of laterally protruding flanges 44A, each having a through hole 44B. Each of the through holes 44B receives one of the fasteners F3 for securing the first reinforcement member 32 to the second reinforcement member 34. As best seen in FIGS. 2 to 5, 10 and 11, the first reinforcement member 32 has a substantially C-shaped cross section defined by the main body 42 and the first and second extensions 44 and 46. As a result, the first reinforcement member 32 has a maximum density primarily defined by the main body 42. Due to the density and bulk of the main body 42 the first reinforcement member 32 can stop or reduce rearward displacement of the grille assembly G when the vehicle 10 experiences a low-speed contact with an external object. In the illustrated embodiment, a low-speed contact refers to a speed of contact with an external object at about 3 miles per hour or slower. In particular, a low speed-contact is a speed of contact between the vehicle 10 and an external object at about 2.5 miles per hour. Due to the configuration of the first and second extensions 44 and 46 being separated by the space S, the first and second extensions 44 and 46 are configured to enable the first reinforcement member 32 to deform upon experiencing a high-speed contact with an external object, as seen in FIG. 5. In the illustrated embodiment, a high-speed contact refers to any vehicle contact with an external object at a speed that is greater than the defined low-speed.

Thus, the first reinforcement member 32 includes a high density portion 46 and a low density portion 48 that is less dense with respect to the high density portion 46. The high density portion 46 is defined by the main body 42 and the low density portion 48 is defined by the first and second extensions 44 and 46. As the first and second extensions 44 and 46 are separated by the space, the low density is less dense with respect to the high density portion 46 due to the space. The high density portion 46 enables the first reinforcement member 32 to stop or reduce rearward displacement of the grille 16 and the grille 16 components. The low density portion 48 enables the first reinforcement member 32 to deform upon the vehicle 10 experiencing a predetermined force in order to dissipate the kinetic energy of the vehicle experiencing contact with an external object.

Referring to FIGS. 6 and 7, the second reinforcement member 34 is fixed to the bumper 24 by suitable means, such as by snap-fit and other suitable fastening means or via fasteners F4 that are received by the bumper 24. The second reinforcement member 34 includes the central region 34A that receives the first reinforcement member 32. As best seen in FIG. 6, the second reinforcement member 34 includes a pair of receiving openings 50 that are aligned with the through hole 44Bs of the first reinforcement member 32 to receive the screws. Each of the receiving openings 50 are disposed on lateral sides of the central region 34A. The fasteners F4 extend through the through holes 44B and into the receiving openings 50, as seen in FIGS. 6 and 7. In this way, the second reinforcement member 34 supports the first reinforcement member 32 with respect to the bumper 24. In the illustrated embodiment, while the first reinforcement member 32 is supported to the bumper 24 by the second reinforcement member 34, it will be apparent to those skilled in the vehicle field from this disclosure that the first reinforcement member 32 can alternatively be fixed directly to the bumper 24.

The second reinforcement member 34 is made and configured to absorb and dissipate kinetic energy away from the bumper 24 and preferably to the vehicle frame. In particular, as the second reinforcement member 34 is less dense than the first reinforcement member 32, the second reinforcement member 34 is configured to deform or collapse more easily than the first reinforcement member 32 to absorb and dissipate energy. As best seen in FIGS. 6 and 7, the second reinforcement member 34 has a longitudinal length L1 that corresponds to a longitudinal length L2 of the bumper 24. The second reinforcement member 34 also has a thickness T1 that substantially corresponds to a thickness T2 of the bumper 24 so that the second reinforcement member 34 substantially covers a forward facing surface of the bumper 24. As best seen in FIGS. 2 to 5, the second reinforcement member 34 has a vehicle forward facing end 34B that extends closer to a vehicle grille 16 than the vehicle forward facing end 42A of the first reinforcement member 32 extends toward the vehicle grille 16. In other words, the second reinforcement member 34 is made and assembled to contact the grille 16 before the first reinforcement member 32 contacts the grille 16 in order to absorb and dissipate energy away from the bumper 24. This way, the second reinforcement deforms to minimize damage to the rigid bumper 24. The first and second reinforcement members 32 and 34 function in conjunction to absorb energy while reinforcing the detector 28 and the detector bracket 36 in the event that the vehicle 10 experiences contact with an external object at a predetermined force.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle reinforcement assembly. Accordingly, these terms, as utilized to describe the present invention should be interpreted relative to a vehicle equipped with the vehicle reinforcement assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle reinforcement assembly comprising:
   a detector configured to be housed in an interior compartment of a vehicle; and
   a reinforcement member configured to be housed in the interior compartment at a location adjacent to the detector, the reinforcement member that is deformable upon receiving a predetermined impact, the reinforcement member having a vehicle forward facing end that extends closer to a vehicle front end than the detector extends to the vehicle front end when the reinforcement member is in a pre-deformed state, the reinforcement member further having
   a main body,
   a first extension extending from the main body and
   a second extension extending from the main body, the first and second extensions being spaced from each other.

2. The vehicle reinforcement assembly according to claim 1, wherein
   the reinforcement member is disposed below the detector.

3. The vehicle reinforcement assembly according to claim 2, wherein
   the reinforcement member is a first reinforcement member and the vehicle reinforcement assembly further includes a second reinforcement member, the first reinforcement member having a density that is greater than a density of the second reinforcement member.

4. The vehicle reinforcement assembly according to claim 3, wherein
   the density of the first reinforcement member is 3 to 7 times greater than the density of the second reinforcement member.

5. The vehicle reinforcement assembly according to claim 4, wherein
   the density of the first reinforcement member is 5 times greater than the density of the second reinforcement member.

6. The vehicle reinforcement assembly according to claim 5, wherein
   the first reinforcement member is supported to the second reinforcement member.

7. The vehicle reinforcement assembly according to claim 6, wherein
   the first reinforcement member is fixed to a central region of the second reinforcement member.

8. The vehicle reinforcement assembly according to claim 7, wherein
   the first reinforcement member is disposed between the second reinforcement member and the detector.

9. The vehicle reinforcement assembly according to claim 1, wherein
   the reinforcement member includes a vehicle rear facing end that faces away from the vehicle forward facing end, the vehicle rear facing end being configured to abut a vehicle bumper.

10. The vehicle reinforcement assembly according to claim 1, wherein
    the first and second extensions include the vehicle rear facing end of the reinforcement member.

11. The vehicle reinforcement assembly according to claim 10, wherein
    the main body includes the vehicle forward facing end and is configured to face a grille component of the vehicle.

12. The vehicle reinforcement assembly according to claim 10, wherein
    the first extension includes a first rear facing surface that is part of the rear facing end, and
    the second extension includes a second rear facing surface that is part of the rear facing end, the first and second rear facing surfaces being spaced from each other.

13. A vehicle comprising:
    a vehicle grille having an interior side and an exterior side;
    a bumper disposed on the interior side of the vehicle grille;
    a detector disposed on the interior side of the vehicle grille and spaced from the vehicle grille;
    a first reinforcement member supported at a location adjacent to the bumper and adjacent to the detector, the first reinforcement member is deformable upon receiving a predetermined impact, the reinforcement member having a vehicle forward facing end that extends closer to the vehicle grille than the detector extends to the vehicle grille when the reinforcement member is in a pre-deformed state, the reinforcement member further having a main body, a first extension extending from the main body and a second extension extending from the main body, the first and second extensions being spaced from each other.

14. The vehicle according to claim 13, wherein
the detector is supported to the bumper, the detector being disposed above the first reinforcement member.

15. The vehicle according to claim 14, further comprising
a second reinforcement member that is fixed to the bumper, the second reinforcement member supporting the first reinforcement member with respect to the bumper.

16. The vehicle according to claim 15, wherein
the first reinforcement member has a density that is greater than a density of the second reinforcement member.

17. The vehicle according to claim 15, wherein
the first reinforcement member has a vehicle rear facing end that abuts the bumper.

18. The vehicle according to claim 15, wherein
the second reinforcement member has a vehicle forward facing end that extends closer to the vehicle grille than the vehicle forward facing end of the first reinforcement member extends toward the vehicle grille.

19. The vehicle according to claim 14, wherein
the first reinforcement member is disposed between the second reinforcement member and the detector.

\* \* \* \* \*